(12) United States Patent
Kong

(10) Patent No.: US 12,541,396 B2
(45) Date of Patent: Feb. 3, 2026

(54) RESOURCE ALLOCATION METHOD AND SYSTEM AFTER SYSTEM RESTART AND RELATED COMPONENT

(71) Applicant: INSPUR SUZHOU INTELLIGENT TECHNOLOGY CO., LTD., Suzhou (CN)

(72) Inventor: Xiangfei Kong, Suzhou (CN)

(73) Assignee: INSPUR SUZHOU INTELLIGENT TECHNOLOGY CO., LTD, Suzhou (CN)

( * ) Notice: Subject to any disclaimer, the term of this patent is extended or adjusted under 35 U.S.C. 154(b) by 412 days.

(21) Appl. No.: 18/260,127

(22) PCT Filed: Oct. 29, 2021

(86) PCT No.: PCT/CN2021/127518
§ 371 (c)(1),
(2) Date: Jun. 30, 2023

(87) PCT Pub. No.: WO2023/284171
PCT Pub. Date: Jan. 19, 2023

(65) Prior Publication Data
US 2024/0061710 A1    Feb. 22, 2024

(30) Foreign Application Priority Data
Jul. 14, 2021   (CN) .......................... 202110792630.7

(51) Int. Cl.
*G06F 9/46* (2006.01)
*G06F 9/50* (2006.01)

(52) U.S. Cl.
CPC .......... *G06F 9/5016* (2013.01); *G06F 9/5038* (2013.01); *G06F 9/5044* (2013.01)

(58) Field of Classification Search
CPC ..... G06F 9/5016; G06F 9/5038; G06F 9/5044
See application file for complete search history.

(56) References Cited

U.S. PATENT DOCUMENTS

| 6,333,936 B1 | 12/2001 | Johansson et al. |
| 2009/0172460 A1 | 7/2009 | Bobak et al. |

(Continued)

FOREIGN PATENT DOCUMENTS

| CN | 105245372 A | 1/2016 |
| CN | 105630602 A | 6/2016 |

(Continued)

OTHER PUBLICATIONS

International Search Report and Written Opinion issued by the China National Intellectual Property Administration acting as International Searching Authority for International Patent Application No. PCT/CN2021/127518 dated Apr. 13, 2022 (13 total pages—with translation).

(Continued)

*Primary Examiner* — Diem K Cao
(74) *Attorney, Agent, or Firm* — Maschoff Brennan

(57) ABSTRACT

A resource allocation method and a system after system restart and a related component. The method comprises: allocating, from a resource pool, a first part of resources to an initialization pre-application module; allocating, from the resource pool, a second part of resources to a cache module, such that the cache module restores cache data to be restored that is in an initialization stage; and repeating the following steps: determining whether current remaining resources in the resource pool can meet a preparation stage application requirement of the cache module or whether there is an IO restoration requirement; allocating resources to the cache module or the IO module, from the resource pool, according to the result of determination; and determining whether the preparation stage application requirement and the IO restoration requirement are completely met, and if so, jumping out of the loop.

20 Claims, 2 Drawing Sheets

(56) References Cited

U.S. PATENT DOCUMENTS

2015/0066880 A1     3/2015  Chai et al.
2019/0146847 A1*    5/2019  Gibson ................ G06F 9/5011
                                                          718/104

FOREIGN PATENT DOCUMENTS

| CN | 109857541 A |   | 6/2019  |            |
|----|-------------|---|---------|------------|
| CN | 109858541 A |   | 6/2019  |            |
| CN | 111258746 A |   | 6/2020  |            |
| CN | 112269658 A |   | 1/2021  |            |
| CN | 112269659 A | * | 1/2021  | G06F 9/5005 |
| CN | 113254223 A |   | 8/2021  |            |
| CN | 113656162 A |   | 11/2021 |            |

OTHER PUBLICATIONS

Notifciation to Grant Patent Right issued by the China National Intellectual Property Administration for Chinese Application No. 202110792630.7 dated Sep. 14, 2021 (5 total pages—with translation).

First Office Action issued by the China National Intellectual Property Administration for Chinese for Chinese Patent Application No. 202110792630.7 dated Aug. 24, 2021 (6 total pages—with translation).

* cited by examiner

RESOURCE ALLOCATION METHOD AND SYSTEM AFTER SYSTEM RESTART AND RELATED COMPONENT

CROSS REFERENCES TO RELATED APPLICATIONS

This application claims the priority of International Patent Application No. PCT/CN2021/127518 filed on Oct. 29, 2021, which claims priority to Chinese Patent Application No. 202110792630.7, filed with China National Intellectual Property Administration on Jul. 14, 2021 and entitled "RESOURCE ALLOCATION METHOD AND SYSTEM AFTER SYSTEM RESTART AND RELATED COMPONENT", their entire contents of which are incorporated herein by reference.

TECHNICAL FIELD

This application relates to the field of server control, and in particular, to a resource allocation method and system after system restart and a related component.

BACKGROUND

Currently, resources need to be reallocated after a system is restarted, and an allocation process goes through stages including initialization pre-application, preparation stage application, and restoration stage input/output (IO) application. Once the initialization pre-application stage occupies excessive resources, remaining resources in a resource pool cannot meet the preparation stage application or restoration stage IO application. A procedure is interrupted, and the system cannot proceed with subsequent procedures.

Therefore, how to provide a solution to the above technical problems is a current problem to be resolved by persons skilled in the art.

SUMMARY

In view of this, an objective of the of this application is to provide a resource allocation method and system after system restart and a related component, to ensure that resource allocation is smoothly performed after system restart. Specific solutions of this application are as follows:

A resource allocation method after system restart includes:
  allocating, from a resource pool according to a pre-application requirement, a first part of resources to an initialization pre-application module;
  allocating, from the resource pool according to a cache restoration requirement, a second part of resources to a cache module, such that the cache module restores cache data to be restored that is in an initialization stage; and
  repeating the following steps:
  determining whether current remaining resources in the resource pool can meet a preparation stage application requirement of the cache module; if the current remaining resources in the resource pool meet the preparation stage application requirement of the cache module, allocating, from the resource pool according to the preparation stage application requirement, a third part of resources to the cache module, and entering a first determining step; and if the current remaining resources in the resource pool do not meet the preparation stage application requirement of the cache module, directly entering the first determining step, where the first determining step includes: determining whether there is an IO restoration requirement; if there is an IO restoration requirement, allocating, from the resource pool according to the IO restoration requirement, a fourth part of resources to an IO processing module, such that the IO processing module processes originally interrupted IO, and triggers pull-to-refresh of the cache module, to release the second part of resources corresponding to the cache data to be restored that has been restored to the resource pool, and entering a second determining step; and if there is no IO restoration requirement, directly entering the second determining step; and
  the second determining step includes: determining whether the preparation stage application requirement and the IO restoration requirement are completely met, and if the preparation stage application requirement and the IO restoration requirement are completely met, jumping out of the loop.

Preferably, a process of determining whether current remaining resources in the resource pool can meet a preparation stage application requirement of the cache module further includes:
  if the current remaining resources in the resource pool do not meet the preparation stage application requirement of the cache module, recording, in a preset data structure, the preparation stage application requirement that the resource pool fails to meet; and
  correspondingly, a process of allocating, from the resource pool according to the preparation stage application requirement, a third part of resources to the cache module further includes:
  updating the preset data structure.

Preferably, a process of allocating, from the resource pool according to the IO restoration requirement, a fourth part of resources to an IO processing module includes:
  determining whether the current remaining resources in the resource pool can meet all IO restoration requirements;
  if the current remaining resources in the resource pool meet all the IO restoration requirements, allocating, from the resource pool according to all the IO restoration requirements, the fourth part of resources to the IO processing module;
  if the current remaining resources in the resource pool do not meet all the IO restoration requirements, classifying a plurality of IO restoration requirements into a first type restoration requirement that the current remaining resources can meet and a second type restoration requirement that the current remaining resources cannot meet;
  recording the second type restoration requirement in the preset data structure; and
  allocating, from the resource pool according to the first type restoration requirement, the fourth part of resources to the IO processing module.

Preferably, a process of classifying a plurality of IO restoration requirements into a first type restoration requirement that the current remaining resources can meet and a second type restoration requirement that the current remaining resources cannot meet includes:
  grouping all the IO restoration requirements by volume into a plurality of groups, and determining a total requirement for each group; and classifying, according to priorities of the plurality of groups of IO restoration requirements, the plurality of IO restoration requirements into the first type restoration requirement that the current remaining resources can meet and the second type restoration requirement that the current remaining resources cannot meet, where the priorities of the plurality of groups of IO restoration requirements in descending order respectively correspond to ascending sorting results of the respective total requirements of the plurality of groups.

Preferably, a process of determining whether the preparation stage application requirement and the IO restoration requirement are completely met, and if the preparation stage application requirement and the IO restoration requirement are completely met, jumping out of the loop specifically includes:

determining whether the preset data structure is empty, and if the preset data structure is empty, jumping out of the loop.

Preferably, the preset data structure is specifically a linked list or a queue.

Preferably, a process of determining whether current remaining resources in the resource pool can meet a preparation stage application requirement of the cache module specifically includes:

determining, at a preset frequency, whether the current remaining resources in the resource pool can meet the preparation stage application requirement of the cache module.

Correspondingly, this application further discloses a resource allocation system after system restart. The system includes:

a first module, configured to allocate, from a resource pool according to a pre-application requirement, a first part of resources to an initialization pre-application module;

a second module, configured to allocate, from the resource pool according to a cache restoration requirement, a second part of resources to a cache module, such that the cache module restores cache data to be restored that is in an initialization stage; and a third module, configured to repeat the following steps:

determining whether current remaining resources in the resource pool can meet a preparation stage application requirement of the cache module; if the current remaining resources in the resource pool meet the preparation stage application requirement of the cache module, allocating, from the resource pool according to the preparation stage application requirement, a third part of resources to the cache module;

determining whether there is an IO restoration requirement;

if there is an IO restoration requirement, allocating, from the resource pool according to the IO restoration requirement, a fourth part of resources to an IO processing module, such that the IO processing module processes originally interrupted IO, and triggers pull-to-refresh of the cache module, to release the second part of resources corresponding to the cache data to be restored that has been restored to the resource pool; and determining whether the preparation stage application requirement and the IO restoration requirement are completely met, and if the preparation stage application requirement and the IO restoration requirement are completely met, jumping out of the loop.

Correspondingly, this application further discloses a resource allocation apparatus after system restart. The apparatus includes:

a memory, configured to store a computer program; and a processor, configured to execute the computer program to implement the steps of the foregoing resource allocation method after system restart.

Correspondingly, this application further discloses a readable storage medium. The readable storage medium stores a computer program, and the computer program, when being executed by a processor, implements the steps of the foregoing resource allocation method after system restart.

In this application, a resource allocation mode is changed to be asynchronous. During allocation of resources for a preparation stage application requirement and an IO restoration requirement, a loop of determining whether resources can be allocated, allocation, and triggering resource release is repeated. The loop is jumped out when both the preparation stage application requirement and the IO restoration requirement are met. It is guaranteed that resource allocation can be smoothly performed, and finally all resource allocation requirements are met, so that a procedure interruption problem that may occur in existing solutions is resolved.

BRIEF DESCRIPTION OF DRAWINGS

To describe the technical solutions in the embodiments of this application or the prior art more clearly, the following briefly introduces the accompanying drawings required for describing the embodiments or the prior art. Apparently, the accompanying drawings in the following description show merely embodiments of this application, and a person of ordinary skill in the art may still derive other drawings from the provided accompanying drawings without creative efforts.

DESCRIPTION OF EMBODIMENTS

The following clearly and completely describes the technical solutions in embodiments of this application with reference to the accompanying drawings in embodiments of this application. It is clear that the described embodiments are merely some but not all of embodiments of this application. All other embodiments obtained by a person of ordinary skill in the art based on embodiments of this application without creative efforts shall fall within the protection scope of this application.

Currently, resources need to be reallocated after a system is restarted, and an allocation process goes through stages including initialization pre-application, preparation stage application, and restoration stage application. Once the initialization pre-application stage occupies excessive resources, remaining resources in a resource pool cannot meet the preparation stage application or restoration stage IO application. A procedure is interrupted, and the system cannot proceed with subsequent procedures.

In this application, a resource allocation mode is changed to be asynchronous. During allocation of resources for a preparation stage application requirement and an IO restoration requirement, a loop of determining whether resources can be allocated, allocation, and triggering resource release is repeated. The loop is jumped out when both the preparation stage application requirement and the IO restoration requirement are met. It is guaranteed that resource allocation can be smoothly performed, and finally all resource allocation requirements are met, so that a procedure interruption problem that may occur in existing solutions is resolved.

Figure 1:
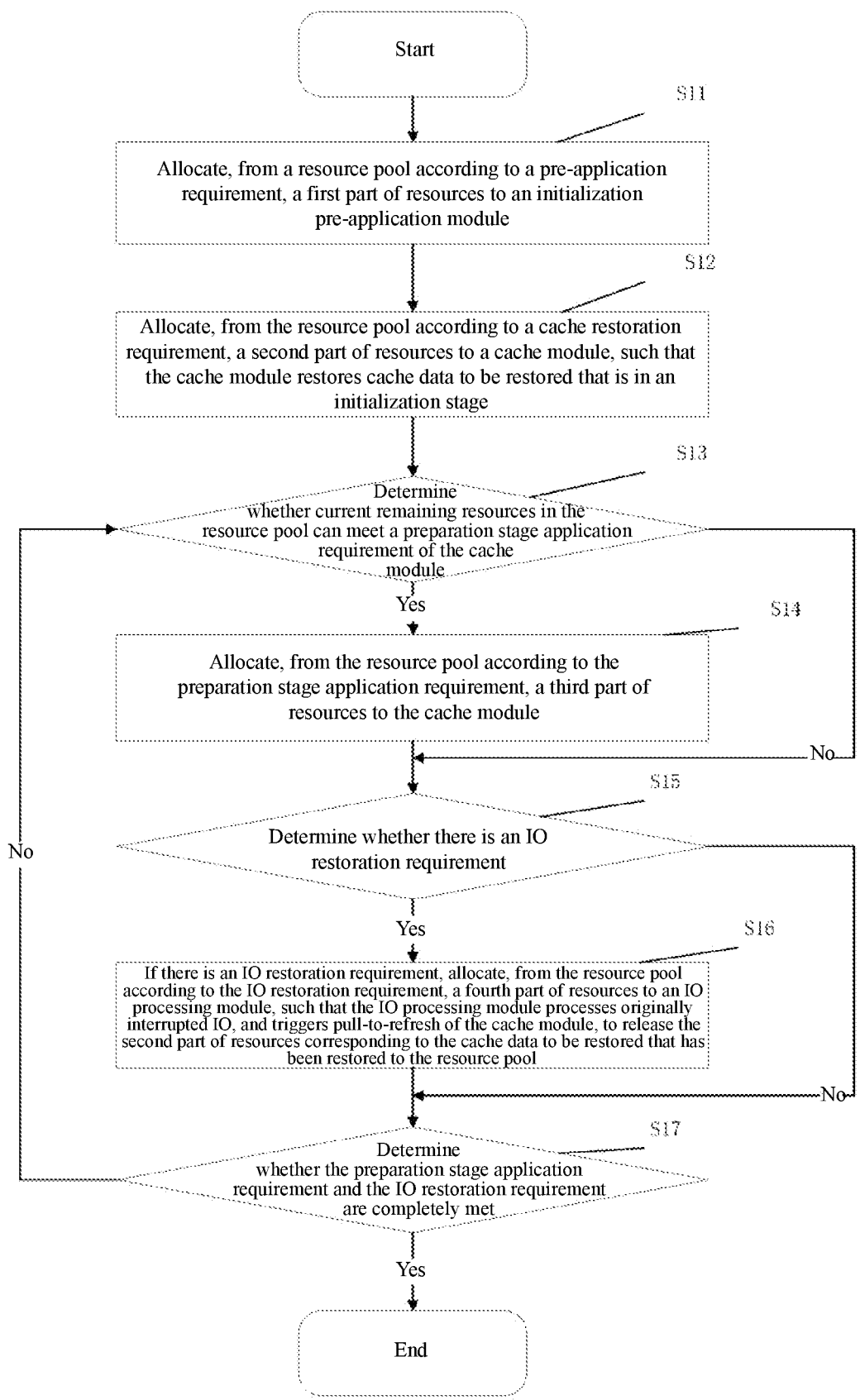
FIG. 1 is a flowchart of steps of a resource allocation method after system restart according to an embodiment of this application.

An embodiment of this application discloses a resource allocation method after system restart. Referring to FIG. 1, the method includes the following steps.

S11: Allocate, from a resource pool according to a pre-application requirement, a first part of resources to an initialization pre-application module.

S12: Allocate, from the resource pool according to a cache restoration requirement, a second part of resources to a cache module, such that the cache module restores cache data to be restored that is in an initialization stage.

The following steps are repeated:

S13: Determine whether current remaining resources in the resource pool can meet a preparation stage application requirement of the cache module; if the current remaining resources in the resource pool meet the preparation stage application requirement of the cache module, perform step S14, and then enter a first determining step; and if the current remaining resources in the resource pool do not meet the preparation stage application requirement of the cache module, directly enter the first determining step.

S14: Allocate, from the resource pool according to the preparation stage application requirement, a third part of resources to the cache module.

Generally, in data synchronization of a dual-node system, a preparation stage application requirement reaches 9600 resource applications. Once current remaining resources cannot be implemented, the process directly skips S14 and enters step S15.

The first determining step is step S15. The step includes the following steps.

S15: Determine whether there is an IO restoration requirement; if there is an IO restoration requirement, perform step S16, and enter a second determining step; and if there is no IO restoration requirement, directly enter the second determining step.

S16: If there is an IO restoration requirement, allocate, from the resource pool according to the IO restoration requirement, a fourth part of resources to an IO processing module, such that the IO processing module processes originally interrupted IO, and triggers pull-to-refresh of the cache module, to release the second part of resources corresponding to the cache data to be restored that has been restored to the resource pool.

The second determining step is step S17. The step includes the following steps.

S17: Determine whether the preparation stage application requirement and the IO restoration requirement are completely met; if the preparation stage application requirement and the IO restoration requirement are completely met, jump out of the loop; and if the preparation stage application requirement and the IO restoration requirement are not completely met, enter step S13.

Specifically, a loop order of steps S13 to S17 remains unchanged. Step S13 may be directly performed after step S17 ends. However, in this case, threads of the entire method occupy a large amount of central processing unit (CPU) resources. To reduce occupancy, corresponding trigger occasions may be set for the entire loop at a preset frequency. A trigger point may be set in step S13. Therefore, a process of determining whether current remaining resources in the resource pool can meet a preparation stage application requirement of the cache module in step S13 specifically includes:

determining, at a preset frequency, whether the current remaining resources in the resource pool can meet the preparation stage application requirement of the cache module.

It may be understood that when determining actions in steps S13 and S16 in this embodiment are executed, related content may be recorded to facilitate content search in subsequent operations. In particular, a preparation stage application requirement and/or an IO restoration requirement that cannot be met are recorded in a preset data structure. A linked list or queue form may be selected for the preset data structure.

Therefore, in this case, a process of determining whether current remaining resources in the resource pool can meet a preparation stage application requirement of the cache module in step S13 further includes:

if the current remaining resources in the resource pool do not meet the preparation stage application requirement of the cache module, recording, in a preset data structure, the preparation stage application requirement that the resource pool fails to meet.

Correspondingly, a process of allocating, from the resource pool according to the preparation stage application requirement, a third part of resources to the cache module in step S14 further includes:

updating the preset data structure.

Specifically, an action of updating the preset data structure is specifically deleting a preparation stage application requirement to which the third part of resources has responded to in the preset data structure.

Figure 2:
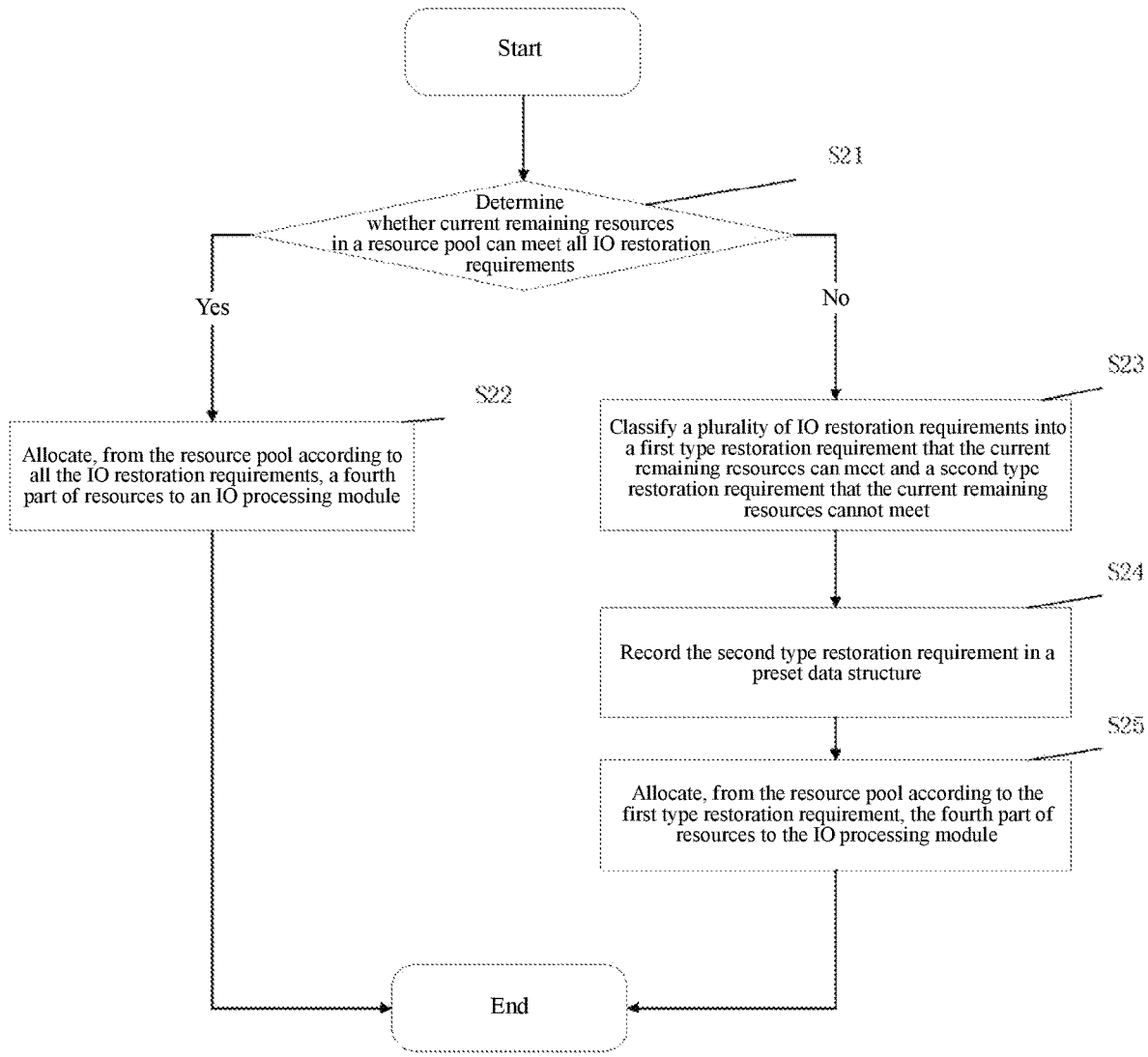
FIG. 2 is a flowchart of substeps of a resource allocation method after system restart according to an embodiment of this application.

Further, the IO restoration requirement may also fail to be met. Therefore, for different cases of the IO restoration requirement, referring to FIG. 2, a process of allocating, from the resource pool according to the IO restoration requirement, a fourth part of resources to an IO processing module in step S16 specifically includes the following steps.

S21: Determine whether the current remaining resources in the resource pool can meet all IO restoration requirements.

S22: If the current remaining resources in the resource pool meet all the IO restoration requirements, allocate, from the resource pool according to all the IO restoration requirements, the fourth part of resources to the IO processing module.

S23: If the current remaining resources in the resource pool do not meet all the IO restoration requirements, classify a plurality of IO restoration requirements into a first type restoration requirement that the current remaining resources can meet and a second type restoration requirement that the current remaining resources cannot meet.

S24: Record the second type restoration requirement in the preset data structure.

S25: Allocate, from the resource pool according to the first type restoration requirement, the fourth part of resources to the IO processing module.

It may be understood that, in step S23, if the current remaining resources cannot meet any IO restoration requirement, the first type restoration requirement is 0, only step S24 is performed, and step S25 is omitted.

Further, in consideration of a pull-to-refresh trigger mechanism of the cache module, a process of classifying a plurality of IO restoration requirements into a first type restoration requirement that the current remaining resources can meet and a second type restoration requirement that the current remaining resources cannot meet in step S23 includes:

grouping all the IO restoration requirements by volume into a plurality of groups, and determining a total requirement for each group; and classifying, according to priorities of the plurality of groups of IO restoration requirements, the plurality of IO restoration requirements into the first type restoration requirement that the current remaining resources can meet and the second type restoration requirement that the current remaining resources cannot meet, where the priorities of the plurality of groups of IO restoration requirements in descending order respectively correspond to ascending sorting results of the respective total requirements of the plurality of groups.

It may be understood that on condition that the preset data structure is recorded, a process of determining whether the preparation stage application requirement and the IO restoration requirement are completely met, and if the preparation stage application requirement and the IO restoration requirement are completely met, jumping out of the loop in step S17 specifically includes:

determining whether the preset data structure is empty, and if the preset data structure is empty, jumping out of the loop.

It may be understood that, in this embodiment, a requirement that temporarily cannot be met is recorded in the preset data structure. The requirement includes a preparation stage application requirement and an IO restoration requirement. Quantities of requirements and required amounts are inconsistent. Selection and allocation are not necessarily performed in a resource order. The preset data structure is traversed, and resources are allocated to a requirement when the resources can meet the requirement, provided that it is guaranteed that a pull-to-refresh trigger mechanism of the cache module does not have a problem each time. In this way, it can be guaranteed that the loop is normally performed, and a problem that system restart is stuck at resource application in the prior art is avoided.

In this application, a resource allocation mode is changed to be asynchronous. During allocation of resources for a preparation stage application requirement and an IO restoration requirement, a loop of determining whether resources can be allocated, allocation, and triggering resource release is repeated. The loop is jumped out when both the preparation stage application requirement and the IO restoration requirement are met. It is guaranteed that resource allocation can be smoothly performed, and finally all resource allocation requirements are met, so that a procedure interruption problem that may occur in existing solutions is resolved.

Figure 3:
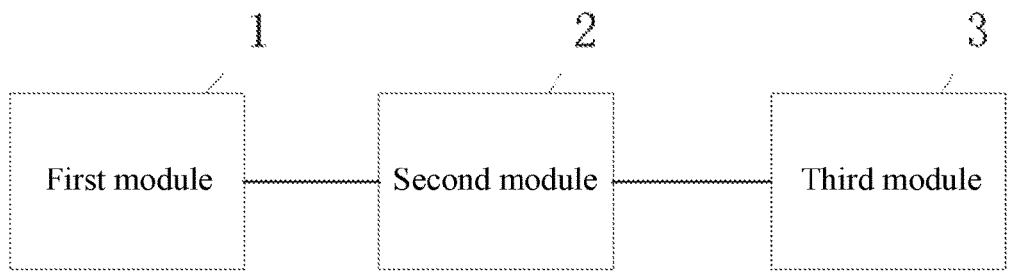
FIG. 3 is a structural distribution diagram of a resource allocation system after system restart an embodiment of this application.

Correspondingly, an embodiment of this application further discloses a resource allocation system after system restart. Referring to FIG. 3, the system includes:

a first module 1, configured to allocate, from a resource pool according to a pre-application requirement, a first part of resources to an initialization pre-application module;

a second module 2, configured to allocate, from the resource pool according to a cache restoration requirement, a second part of resources to a cache module, such that the cache module restores cache data to be restored that is in an initialization stage; and a third module 3, configured to repeat the following steps:

determining whether current remaining resources in the resource pool can meet a preparation stage application requirement of the cache module; if the current remaining resources in the resource pool meet the preparation stage application requirement of the cache module, allocating, from the resource pool according to the preparation stage application requirement, a third part of resources to the cache module, and entering a first determining step; and if the current remaining resources in the resource pool do not meet the preparation stage application requirement of the cache module, directly entering the first determining step, where the first determining step includes: determining whether there is an IO restoration requirement; if there is an IO restoration requirement, allocating, from the resource pool according to the IO restoration requirement, a fourth part of resources to an IO processing module, such that the IO processing module processes originally interrupted IO, and triggers pull-to-refresh of the cache module, to release the second part of resources corresponding to the cache data to be restored that has been restored to the resource pool, and entering a second determining step; and if there is no IO restoration requirement, directly entering the second determining step; and the second determining step includes: determining whether the preparation stage application requirement and the IO restoration requirement are completely met, and if the preparation stage application requirement and the IO restoration requirement are completely met, jumping out of the loop.

In this application, a resource allocation mode is changed to be asynchronous. During allocation of resources for a preparation stage application requirement and an IO restoration requirement, a loop of determining whether resources can be allocated, allocation, and triggering resource release is repeated. The loop is jumped out when both the preparation stage application requirement and the IO restoration requirement are met. It is guaranteed that resource allocation can be smoothly performed, and finally all resource allocation requirements are met, so that a procedure interruption problem that may occur in existing solutions is resolved.

Correspondingly, an embodiment of this application further discloses a resource allocation apparatus after system restart. The apparatus includes:

a memory, configured to store a computer program; and
a processor, configured to execute the computer program to implement the steps of the resource allocation method after system restart according to any foregoing embodiment.

Correspondingly, an embodiment of this application further discloses a readable storage medium. The readable storage medium stores a computer program, and the computer program, when being executed by a processor, implements the steps of the foregoing resource allocation method after system restart according to any foregoing embodiment.

For specific detailed content related to the resource allocation method after system restart in this embodiment, refer to detailed descriptions in the foregoing embodiments. Details are not described herein again.

The resource allocation apparatus after system restart and the readable storage medium in the embodiments both have technical effects as those in the foregoing embodiments. Details are not described herein again.

Finally, it should be noted that the relational terms herein such as first and second are used only to differentiate an entity or operation from another entity or operation, and do not require or imply any actual relationship or sequence between these entities or operations. Moreover, the terms "include", "comprise", or any variation thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. If no more limitations are made, an element limited by "include a/an . . . " does not exclude other same elements existing in the process, the method, the object or the device which includes the element.

The resource allocation method and system after system restart and the related component provided in this application are described above in detail. Although the principle and implementation manners of this application are described by using specific examples in this specification, descriptions of the embodiments are merely intended to help understand the methods and core idea of this application. In addition, for a person of ordinary skill in the art, according to the idea of this application, changes may be made to the specific implementation and the scope of application. In summary, the content of this specification should not be construed as a limitation to this application.

The invention claimed is:

1. A resource allocation method after system restart, comprising:
    allocating, from a resource pool according to a pre-application requirement, a first part of resources to an initialization pre-application module;
    allocating, from the resource pool according to a cache restoration requirement, a second part of resources to a cache module, such that the cache module restores cache data to be restored that is in an initialization stage; and
    repeating the following steps:
    determining whether current remaining resources in the resource pool can meet a preparation stage application requirement of the cache module; if the current remaining resources in the resource pool meet the preparation stage application requirement of the cache module, allocating, from the resource pool according to the preparation stage application requirement, a third part of resources to the cache module, and entering a first determining step; and if the current remaining resources in the resource pool do not meet the preparation stage application requirement of the cache module, directly entering the first determining step, wherein
    the first determining step comprises: determining whether there is an IO restoration requirement; if there is an IO restoration requirement, allocating, from the resource pool according to the IO restoration requirement, a fourth part of resources to an IO processing module, such that the IO processing module processes originally interrupted IO, and triggers pull-to-refresh of the cache module, to release the second part of resources corresponding to the cache data to be restored that has been restored to the resource pool, and entering a second determining step; and if there is no IO restoration requirement, directly entering the second determining step; and
    the second determining step comprises: determining whether the preparation stage application requirement and the IO restoration requirement are completely met, and if the preparation stage application requirement and the IO restoration requirement are completely met, jumping out of the loop.

2. The resource allocation method according to claim 1, wherein a process of determining whether current remaining resources in the resource pool can meet a preparation stage application requirement of the cache module further comprises:
    if the current remaining resources in the resource pool do not meet the preparation stage application requirement of the cache module, recording, in a preset data structure, the preparation stage application requirement that the resource pool fails to meet; and
    correspondingly, a process of allocating, from the resource pool according to the preparation stage application requirement, a third part of resources to the cache module further comprises:
    updating the preset data structure.

3. The resource allocation method according to claim 2, wherein a process of allocating, from the resource pool according to the IO restoration requirement, a fourth part of resources to an IO processing module comprises:
    determining whether the current remaining resources in the resource pool can meet all IO restoration requirements;
    if the current remaining resources in the resource pool meet all the IO restoration requirements, allocating, from the resource pool according to all the IO restoration requirements, the fourth part of resources to the IO processing module;
    if the current remaining resources in the resource pool do not meet all the IO restoration requirements, classifying a plurality of IO restoration requirements into a first type restoration requirement that the current remaining resources can meet and a second type restoration requirement that the current remaining resources cannot meet;
    recording the second type restoration requirement in the preset data structure; and
    allocating, from the resource pool according to the first type restoration requirement, the fourth part of resources to the IO processing module.

4. The resource allocation method according to claim 3, wherein a process of classifying a plurality of IO restoration requirements into a first type restoration requirement that the current remaining resources can meet and a second type restoration requirement that the current remaining resources cannot meet comprises:
    grouping all the IO restoration requirements by volume into a plurality of groups, and determining a total requirement for each group; and
    classifying, according to priorities of the plurality of groups of IO restoration requirements, the plurality of IO restoration requirements into the first type restoration requirement that the current remaining resources can meet and the second type restoration requirement that the current remaining resources cannot meet, wherein
    the priorities of the plurality of groups of IO restoration requirements in descending order respectively correspond to ascending sorting results of the respective total requirements of the plurality of groups.

5. The resource allocation method according to claim 3, wherein a process of determining whether the preparation stage application requirement and the IO restoration requirement are completely met, and if the preparation stage application requirement and the IO restoration requirement are completely met, jumping out of the loop specifically comprises:

determining whether the preset data structure is empty, and if the preset data structure is empty, jumping out of the loop.

6. The resource allocation method after system restart according to claim 3, wherein, in response to that the current remaining resources cannot meet any IO restoration requirement, only the step of recording the second type restoration requirement in the preset data structure is performed.

7. The resource allocation method according to claim 2, wherein the preset data structure is specifically a linked list or a queue.

8. The resource allocation method according to claim 7, wherein a process of determining whether current remaining resources in the resource pool can meet a preparation stage application requirement of the cache module specifically comprises:
determining, at a preset frequency, whether the current remaining resources in the resource pool can meet the preparation stage application requirement of the cache module.

9. The resource allocation method after system restart according to claim 2, wherein, a process of updating the preset data structure comprises:
deleting a preparation stage application requirement to which the third part of resources has responded in the preset data structure.

10. The resource allocation method after system restart according to claim 2, wherein, in response to that the current remaining resources in the resource pool do not meet the IO restoration requirement, recording, in the preset data structure, the IO restoration requirement that the resource pool fails to meet.

11. The resource allocation method after system restart according to claim 2, wherein, during selection and allocation, the preset data structure is traversed, and resources are allocated to a requirement which can be met.

12. The resource allocation method according to claim 1, wherein the first determining step further comprises:
determining whether there is an IO restoration requirement; if there is an IO restoration requirement, allocating, from the resource pool according to an IO restoration requirement that the current remaining resources in the resource pool can meet, the fourth part of resources to the IO processing module, such that the IO processing module processes the originally interrupted IO, and triggers the pull-to-refresh of the cache module, to release the second part of resources corresponding to the cache data to be restored that has been restored to the resource pool, and entering the second determining step; and if there is no IO restoration requirement, directly entering the second determining step.

13. The resource allocation method after system restart according to claim 1, wherein, corresponding trigger occasions are set for the repeated steps at a preset frequency.

14. The resource allocation method after system restart according to claim 13, wherein, determining, at the preset frequency, whether the current remaining resources in the resource pool can meet the preparation stage application requirement of the cache module.

15. The resource allocation method after system restart according to claim 13, wherein, a trigger point of the trigger occasions is set at the step of determining whether the current remaining resources in the resource pool can meet the preparation stage application requirement of the cache module.

16. The resource allocation method after system restart according to claim 1, wherein, a resource allocation mode of the method is asynchronous.

17. The resource allocation method after system restart according to claim 1, wherein, in response to performing the step of determining whether the current remaining resources in the resource pool meet the preparation stage application requirement of the cache module and performing the step of determining whether there is an IO restoration requirement, recording the corresponding results of the determination to facilitate content search in subsequent operations.

18. The resource allocation method after system restart according to claim 17, wherein, the step of recording comprises:
recording a preparation stage application requirement and/or an IO restoration requirement that cannot be met in a preset data structure.

19. A resource allocation apparatus after system restart, comprising:
a memory, configured to store a computer program; and
a processor, configured to execute the computer program to implement the steps of the resource allocation method after system restart according to claim 1.

20. A non-transitory computer readable storage medium, wherein the non-transitory computer readable storage medium stores a computer program, and the computer program, when being executed by a processor, implements the steps of the resource allocation method after system restart according to claim 1.

* * * * *